United States Patent [19]

Quach

[11] Patent Number: 5,091,491
[45] Date of Patent: Feb. 25, 1992

[54] WATER-SOLUBLE ALLYLPHOSPHONATE COPOLYMERS

[75] Inventor: Loc Quach, Columbia, Md.

[73] Assignee: W. R. Grace & Co.-Conn., New York, N.Y.

[21] Appl. No.: 607,980

[22] Filed: Nov. 1, 1990

[51] Int. Cl.$^5$ .................. C08F 230/02; C08F 228/02; C08F 226/06

[52] U.S. Cl. .................. 526/278; 526/287; 526/288; 526/312

[58] Field of Search ......................................... 526/278

[56] References Cited

U.S. PATENT DOCUMENTS

| | | | |
|---|---|---|---|
| 2,636,027 | 4/1953 | Coover et al. | 526/278 |
| 3,684,779 | 8/1972 | Rapko | 526/271 |
| 3,719,756 | 3/1973 | Francis . | |
| 4,017,564 | 4/1977 | Arend et al. . | |
| 4,048,066 | 9/1977 | Cuisia et al. . | |
| 4,306,991 | 12/1981 | Hwa et al. . | |
| 4,432,879 | 2/1984 | Greaves et al. . | |
| 4,446,028 | 5/1984 | Becker . | |
| 4,446,046 | 5/1984 | Becker . | |
| 4,499,002 | 2/1985 | Masler III et al. . | |
| 4,518,745 | 5/1985 | Engelhardt et al. . | |
| 4,743,666 | 5/1988 | Engelhardt et al. . | |
| 4,849,129 | 7/1989 | Chen et al. | 252/181 |
| 4,863,614 | 9/1989 | Chen et al. . | |
| 4,885,097 | 12/1989 | Amjad et al. . | |

FOREIGN PATENT DOCUMENTS 0218351 4/1987 European Pat. Off. .

OTHER PUBLICATIONS

Losungsverhalten und thermische Eigenschaften von Styrencopolymerer ungesattigter Phosphonsauren—M. Hartmann et al. (translation).
Synthese von Styrencopolymeren ungesattigter Phosphonsauren und Phosphonsaureester—M. Hartmann et al. (translation).

*Primary Examiner*—Joseph L. Schofer
*Assistant Examiner*—Wu C. Cheng

*Attorney, Agent, or Firm*—James P. Barr

[57] ABSTRACT

This invention relates to water-soluble allylphosphonate copolymers which are useful for treating aqueous systems. The allylphosphonate copolymers are characterized as having the formula:

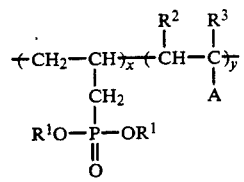

wherein the molar percentage of x in the copolymer is from 1 to 90 percent, the molar percentage of y in the copolymer is from 10 to 99 percent, and the total of x and y being 100 percent; and wherein each $R^1$ is independently selected from the group consisting of hydrogen, lower alkyl groups having from 1 to about 4 carbon atoms and a salt forming cation, $R^2$ and $R^3$ are independently selected from the group consisting of hydrogen, halogen, COOH, $CH_2COOH$, lower alkyl groups having from 1 to about 4 carbon atoms, and phenyl, and A is selected from the group consisting of COOH, $CH_2COOH$, $\phi COOH$, $SO_3H$, $CH_2SO_3H$, $CH(CH_3)SO_3H$, $CH_2OCH_2CH(OH)CH_2SO_3H$, $\phi$-$SO_3H$,

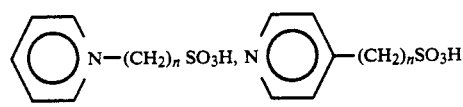

wherein n=2 to 4, $CONH_2$, $CONHCHH_3$, $CON(CH_3)_2$, $CONHCH_2OH$, $CONHCH(OH)COOH$, $CONHC(CH_3)_2CH_2SO_3H$, $COO(CH_2)_nSO_3H$, wherein n=2 to 4, and $CO(OCH_2CH_2)_nOH$ wherein n=1 or more, water soluble salts of sulfonate and carboxylate groups.

17 Claims, No Drawings

WATER-SOLUBLE ALLYLPHOSPHONATE COPOLYMERS

FIELD OF THE INVENTION

This invention relates to polymeric materials containing phosphonate groups which are useful in water treatment, and more particularly to water-soluble polymeric materials which are prepared by copolymerizing allylphosphonic acid or esters thereof with certain other water-soluble monomers.

BACKGROUND OF THE INVENTION

Various polymeric materials containing phosphonate groups have been reported as useful for such purposes as water treatment, leather retanning, pigment dyeing, and the treatment of animals. For example U.S. Pat. No. 3,719,756 discloses pharmaceutically acceptable poly(vinylidene diphosphonic acid) compounds which can be prepared by adding isopropyl ester of methylenediphosphonic acid to a slurry of sodium hydride in dry benzene and thereafter adding methylene bromide. U.S. Pat. No. 4,518,745 and 4,743,666 disclose the preparation of certain water-soluble copolymers (and metal chelates thereof) derived by polymerizing vinylphosphonic acid and/or vinylphosphonic acid esters with other monomers such as 2-acrylamido-2-methylpropanesulfonic acid, acrylamide, N-vinyl-N-methylacetamide, methacrylic acid, N-vinylpyrrolidone and/or styrene sulfonic acid. U.S. Pat. No. 4,446,046 discloses poly(alkenyl)phosphonic acid polymers such as poly(isopropenylphosphonic acid) which are prepared by polymerizing the desired alphabeta ethylenically unsaturated phosphonic acid monomers; and corrosion inhibiting and deposit control activity thereof in aqueous systems. European Patent Application Publication No. 0218351 discloses the preparation of polymeric materials from acrylic acid or methacrylic acid; 2-acrylamido-2-methylpropylsulfonic acid or 2-methacrylamido-2-methylpropylsulfonic acid; and 2-acrylamido-2-methylpropylphosphonic acid or 2-methacrylamido-2-methylpropylphosphonic acid; and the inhibition of corrosion and scale-forming salt precipitation therewith. Dialkyl esters of allyl phosphonic may be prepared in accordance with U.S. Pat. No. 4,017,564, and according to said patent, may be polymerized in a wide range of proportions with such monomers as acrylonitrile, vinyl and vinylidene halides, styrene and/or butadiene to form substantially non-flammable copolymers. However, unsaturated phosphonate monomers such as allylphosphonic acid are considered to have low reactivity and are thus relatively difficult to polymerize. M. Hartman et al. "Solution Behavior and Thermal Properties of Styrene Copolymer of Unsaturated Phosphonic Acids", Acta Polymerica 31, 700–703 (1980) disclose the solution behavior and thermal and mechanical behavior of styrene copolymers of unsaturated phosphonic acids and their ethyl esters. As expected, the solubility of these copolymers is determined by the position of the phosphonic acid group on the polymer chain. M. Hartman et al "Synthesis of Styrene Copolymers with Unsaturated Phosphonic Acids and Phosphonic Acid Esters", Acta Polymerica 31, 165–168 (1980) disclose a method of preparing styrene copolymers of unsaturated phosphonic acids wherein esters of vinyl phosphonic acid, allyl phosphonic acid, 4-vinyl benzene phosphonic acid and 2-(4-vinyl-phenyl) ethane phosphonic acid are first copolymerized with styrene and then subsequently hydrolyzed. These polymers may be used as ion exchange resins, flame retardants, coating materials for metal corrosion inhibition, and in improving the coloring of textile fibers. This reference discloses that neither phosphonylation of polymers nor copolymerization of unsaturated free phosphonic acids proved to be very suitable for the synthesis of soluble, phosphonic acid containing styrene copolymers.

SUMMARY OF THE INVENTION

It is an object of this invention to provide a novel water soluble phosphonate-containing polymer.

It is another object of this invention to provide a method of preparing a water soluble phosphonate-containing polymer.

In accordance with this invention, there have been provided certain water-soluble polymeric materials containing phosphonate groups which are useful for treating aqueous systems, said polymers being derived from copolymerizing allylphosphonic acid and/or its lower alkyl esters with one or more other water-soluble monomers.

Also provided in accordance with this invention is a method of preparing water-soluble, phosphonate-containing polymers derived by copolymerizing allylphosphonic acid and/or its lower alkyl esters with one or more water-soluble monomers.

DETAILED DESCRIPTION

This invention relates to novel polymeric materials which are derived from one or more allyl phosphonate monomers having the formula:

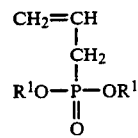

and one or more water soluble, $\alpha, \beta$-ethylenically unsaturated, non-phosphorus containing monomers having the formula:

wherein each $R^1$ is independently selected from the group consisting of hydrogen, lower alkyl groups having from 1 to about 4 carbon atoms and a salt forming cation, $R^2$ and $R^3$ are independently selected from the group consisting of hydrogen, halogen, COOH, $CH_2COOH$, lower alkyl groups having from 1 to about 4 carbon atoms, and phenyl, and A is selected from the group consisting of COOH, $CH_2COOH$, $\phi COOH$, $SO_3H$, $CH_2SO_3H$, $CH(CH_3)SO_3H$, $CH_2OCH_2CH(OH)CH_2SO_3H$, $\phi$-$SO_3H$,

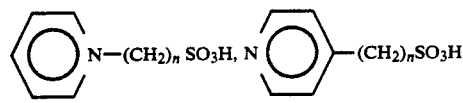

wherein n=2 to 4, $CONH_2$, $CONHCH_3$, $CON(CH_3)_2$, $CONHCH_2OH$, $CONHCH(OH)COOH$, CONHC(CH$_3$)$_2$CH$_2$SO$_3$H, COO(CH$_2$)$_n$SO$_3$H wherein n=2 to 4, and CO(OCH$_2$CH$_2$)$_n$OH wherein n=1 or more, water soluble salts of sulfonate and carboxylate groups.

In a preferred embodiment, the water soluble copolymer is derived from one or more allyl phosphonic acid monomers having the above formula wherein R$^1$ is hydrogen, CH$_2$CH$_3$ or a mixture of monomers having hydrogen and CH$_2$CH$_3$, and one or more water-soluble, α, β-ethylenically unsaturated, non-phosphorus containing monomers having the above formula wherein R$^2$ is hydrogen or COOH, R$^3$ is hydrogen or CH$_3$ and A is COOH, CH$_2$COOH, CH$_2$SO$_3$H, φSO$_3$H, CONHC(CH$_3$)$_2$CH$_2$SO$_3$H, CH$_2$OCH$_2$CH(OH)CH$_2$SO$_3$H, or a mixture of monomers having the above substituted groups.

A preferred allylphosphonate copolymer is derived from mixtures of monomers which include the following: R$^1$ is hydrogen, CH$_2$CH$_3$ or mixtures thereof, together with a first comonomer wherein R$^2$ is COOH, R$^3$ is hydrogen, A is COOH, and a second comonomer wherein R$^2$ is hydrogen, R$^3$ is hydrogen and A is CH$_2$SO$_3$H, φSO$_3$H, CONHC(CH$_3$)$_2$CH$_2$SO$_3$H or mixtures thereof.

Another preferred allylphosphonate copolymer derived from mixtures of monomers include the following: R$^1$ is hydrogen, CH$_2$CH$_3$ or mixtures thereof, together with a first comonomer wherein R$^2$ is hydrogen, R$^3$ is hydrogen, CH$_3$ or mixtures thereof, A is COOH, and a second comonomer wherein R$^2$ is hydrogen, R$^3$ is hydrogen and A is CH$_2$SO$_3$H, φSO$_3$H, CONHC(CH$_3$)$_2$CH$_2$SO$_3$H and mixtures thereof.

The average molecular weight, based on a weight average, is generally between about 500 and one million, preferably between about 1000 to 500,000, although polymers having molecular weights below 500 and above one million may also be used with some success. Preferably the average molecular weight of the polymers used for water treatment is at least about 800–10,000 and is most preferably at least about 1000.

The allylphosphonate copolymers of this invention comprise repeat units as represented by the generalized formula:

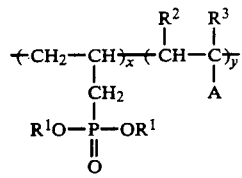

wherein R$^1$, R$^2$, R$^3$ and A are as above defined, and the molar percentage of x in the copolymer is from 1 to 90 percent and the molar percentage of y in the copolymer is from 10 to 99 percent, and the total of x and y equals 100 percent. When both R$^1$ groups are C$_1$ to C$_4$ alkyl, it is preferred that the molar percentage of x in the copolymer be between 1 to 50 percent due to solubility considerations.

In accordance with this invention, the allylphosphonate copolymers are prepared by first hydrolyzing an unsaturated phosphonate monomer with a suitable inorganic or organic acid such as for example hydrochloric acid, sulfuric acid, nitric acid, allylphosphonic acid and the like. The unsaturated phosphonate monomer is represented by the formula:

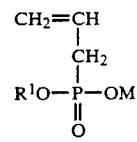

wherein M is hydrogen or a salt forming cation, R$^1$ is selected from the group consisting of hydrogen, C$_1$ to C$_4$ alkyl, and salt-forming cations. The hydrolyzed monomers, or mixtures of one or more hydrolyzed monomers having the above described formula, are then directly copolymerized with a water-soluble non-phosphorus containing monomer, or mixture of one or more water-soluble non-phosphorus containing monomers represented by the formula:

wherein R$^2$ and R$^3$ are independently selected from the group consisting of hydrogen, phenyl, COOH, halogen, C$_1$ to C$_4$ alkyl and CH$_2$COOH, and A is selected from the group consisting of COOH, CH$_2$COOH, φCOOH, SO$_3$H, CH$_2$SO$_3$H, CH(CH$_3$)SO$_3$H, CH$_2$OCH$_2$CH(OH)CH$_2$SO$_3$H, φ-SO$_3$H,

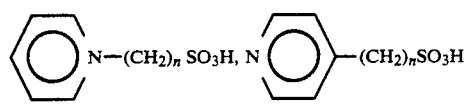

wherein n=2 to 4, CONH$_2$, CONHCH$_3$, CON(CH$_3$)$_2$, CONHCH$_2$OH, CONHCH(OH)COOH and CONHC(CH$_3$)$_2$CH$_2$SO$_3$H; COO(CH$_2$)$_n$SO$_3$H wherein n=2 to 4, CO(OCH$_2$CH$_2$)$_n$OH wherein n=1 or more, water soluble salts of sulfonate and carboxylate groups. When both R$^1$ groups of the allylphosphonate copolymer are C$_1$ to C$_4$ alkyl, it is not necessary to hydrolyze the unsaturated phosphonate monomer prior to copolymerization with the water soluble, non-phosphorus containing monomers. Thus, to prepare the allylphosphonate copolymers when both R$^1$ groups are C$_1$ to C$_4$ alkyl, the unsaturated phosphonate monomer having the formula:

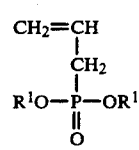

is copolymerized with a water-soluble, non-phosphorus containing monomer having the formula:

in the presence of a free radical initiator under reactive conditions and wherein R$^1$ is C$_1$ to C$_4$ alkyl, R$^2$ and R$^3$ are independently selected from the group consisting of hydrogen, phenyl, COOH, halogen, $C_1$ to $C_4$ alkyl and $CH_2COOH$, and A is selected from the group consisting of COOH, $CH_2COOH$, $\phi COOH$, $SO_3H$, $CH_2SO_3H$, $CH(CH_3)SO_3H$, $CH_2OCH_2CH(OH)CH_2SO_3H$, $\phi$-$SO_3H$,

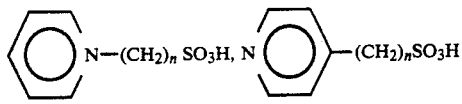

wherein n=2 to 4, $CONH_2$, $CONHCH_3$, $CON(CH_3)_2$, $CONHCH_2OH$, $CONHCH(OH)COOH$ and $CONHC(CH_3)_2CH_2SO_3H$; $COO(CH_2)_nSO_3H$ wherein n=2 to 4, $CO(OCH_2CH_2)_nOH$ wherein n=1 or more, water soluble salts of sulfonate and carboxylate groups.

Suitable free-radical initiators for use in this invention which are preferably water-soluble, include, but are not limited to diazo initiators, persulfate initiators, peroxide initiators and free-radical redox systems.

The copolymerization can be performed by using either bulk, solution, suspension or emulsion polymerization techniques.

The copolymerization reaction is generally performed at elevated temperatures, typically between 50° and 110° C., and preferably between 60° and 90° C. and can be performed under reduced, atmospheric or elevated pressures.

Examples of various water-soluble monomers which may be copolymerized with allylphosphonic acid, its lower alkyl ester, and/or metal salts include, but are not limited to; vinyl sulfonic acid, allylsulfonic acid, methallylsulfonic acid, 2-hydroxy-3-allyloxy-1-propanesulfonic acid, styrene sulfonic acid, sulfoalkyl acrylate, sulfoalkyl methacrylate, acrylamide, methacrylamide, N-methyl acrylamide, N-methyl methacrylamide, N,N-dimethylacrylamide, N-hydroxymethylacrylamide, N-hydroxymethyl methacrylamide, acrylamidoglycolic acid, 2-acrylamido-2-methyl-1-propane sulfonic acid, and their lower alkyl derivatives, acrylic acid, methacrylic acid, haloacrylic acid, halomethacrylic acid, itaconic acid, crotonic acid, methylmethacrylic acid, methyl itaconic acid, maleic acid, fumaric acid, citraconic acid, aconitic acid and their lower alkyl derivatives, and mixtures thereof. It is to be noted that the proportions of structural units in the resulting copolymer do not necessarily correspond with the proportions of ethylenically unsaturated monomer present during such copolymerization.

The following examples are provided to illustrate the invention in accordance with the principles of this invention, but are not to be construed as limiting the invention in anyway except as indicated in the appended claims. All parts are by weight and percentages are by moles unless otherwise indicated.

EXAMPLE 1

70 g of diethyl allylphosphonate and 105 ml of concentrated hydrochloric acid were placed in a round-bottom flask and the mixture was heated to reflux for 16 hours. The product was isolated by evaporating off the volatile compounds under vacuum. $^1H$ and $^{31}P$ NMR measurements indicated a mixture of allylphosphonic acid (APA) and ethyl allylphosphonic acid (EAPA) at 71:29 molar ratio.

EXAMPLE 2

A 50 ml three-neck reaction flask equipped with a condenser, a thermometer, and a nitrogen gas inlet was charged with 6.8 g of the APA-EAPA monomers from Example 1, 3.8 g of acrylic acid, 0.10 g of 2,2'-azobis(2-amidinopropane) dihydrochloride, and 31 ml deionized water. The solution was heated at 60° C. for 20 hours while stirring. After reaction, the solution was dialyzed against deionized water using a 3500 molecular weight cut-off membrane, followed by a lyophilization, giving 4.7 g of purified polymer.

The polymer comprised 7 mole % APA, 3 mole % EPA and 90 mole % acrylic acid (by $^{31}P$ NMR) having weight-average (Mw) and number-average (Mn) molecular weights of 180,000 and 82,000, respectively as determined by gel permeation chromatography (GPC).

EXAMPLE 3

Into a 50 ml flask, as described in Example 2, were charged 6.3 g of the APA-EAPA monomers from Example 1, 4.2 g of methacrylic acid, 0.10 g of 2,2'-azobis(2-amidinopropane) dihydrochloride, and 31 ml of deionized water. The solution was heated at 60° C. for 20 hours while stirring. The resulting polymer was purified and isolated in the same manner as described in Example 2, giving 4.3 g powder.

The polymer comprised 4 mole % APA, 2 mole % EAPA and 94 mole % methacrylic acid (by $^{31}P$ NMR) and had Mw and Mn (by GPC) of 225,000 and 98,000, respectively.

EXAMPLE 4

A 50-ml four-neck reaction flask was equipped with a magnetic stirrer, a condenser, a thermometer, a nitrogen gas inlet and a syringe for addition of initiator solution. The flask was charged with 3.6 g of the APA-EAPA monomers from Example 1, 2.0 g of acrylic acid, 14.6 g of 25% aqueous solution of sodium vinylsulfonate. After the flask was heated to 60° C. under a nitrogen blanket, a solution of 0.18 g of 2,2'azobis(2-amidinopropane) dihydrochloride in 3 ml deionized water was added slowly over a 5-hour period. The reaction was continued at 60° C. for another 9 hours. The resulting polymer was purified and isolated in the same manner as described in Example 2, yielding 2.8 g product.

The $^1H$ and $^{31}P$ NMR indicated 20 mole % of APA, 4 mole % of EAPA, 59 mole % of acrylic acid and 17 mole % of sodium vinylsulfonate units in the polymer. GPC measurements showed Mw and Mn of 137,000 and 64,000, respectively.

EXAMPLE 5

In a 50 ml flask similar to that of Example 2 were charged 3.6 g of the APA-EAPA monomers from Example 1, 2.4 g methacrylic acid, 14.6 g of 25% aqueous solution of sodium vinylsulfonate, 0.10 g of 4,4'-azobis(4-cyanovaleric acid) and 18 ml deionized water. After the reaction flask was heated at 60° C. for 14 hours under a nitrogen atmosphere, the resulting polymer was purified and isolated in the same manner as described in Example 2, giving 2.7 g of white powder.

The $^1H$ and $^{31}P$ NMR measurements indicated 8 mole % 5 APA, 3 mole % EAPA, 76 mole % methacrylic acid and 13 mole % sodium vinylsulfonate units in the polymer. The Mw and Mn determined by GPC were 201,000 and 90,000, respectively.

EXAMPLE 6

Into a 100 ml flask similar to that of Example 4 were charged 4.9 g of the APA-EAPA monomers from Example 1, 0.35 g of 2,2'-azobis[2-methyl-N-(2-hydroxyethyl)propionamide]and 3 ml deionized water. After the solution was heated to 90° C. under a nitrogen atmosphere, a solution of 7.2 g sodium styrenesulfonate and 32 ml deionized water was added slowly to the flask over a 4-hour period. After addition, the reaction was continued for another 8 hours at 90° C. The resulting polymer was purified and isolated in the same manner as described in Example 2, yielding 6.0 g powder.

The polymer was comprised of 12 mole % APA, 5 mole % EAPA, 83 mole % sodium styrenesulfonate (by $^1$H and $^{31}$P NMR) and had Mw and Mn (by GPC) of 24,000 and 5,800, respectively.

EXAMPLE 7

Into a 50 ml flask similar to that of Example 4 were charged 3.6 g of the APA-EAPA monomers from Example 1, 56 mg of 2,2'-azobis(2-amidinopropane) dihydrochloride and 5 ml deionized water. The flask was heated to 60° C. in a nitrogen atmosphere. A solution containing 2.0 g acrylic acid, 5.7 g sodium styrenesulfonate, 56 mg 2,2'-azobis(2-amidinopropane) dihydrochloride and 17 ml deionized water was added into the flask via a syringe over a period of 11 hours. After addition, the reaction was continued further for 20 hours at 60° C. The resulting powder was purified and isolated in the same manner as described in Example 2, giving 3.7 g of white powder.

The $^1$H and $^{31}$P NMR indicated 10 mole % of APA, 5 mole % of EAPA, 38 mole % of acrylic acid and 47 mole % of sodium styrenesulfonate moieties in the polymer. The Mw and Mn determined by GPC were 63,000 and 27,000, respectively.

EXAMPLE 8

Into a 100 ml flask similar to that of Example 2 were charged 4.5 g of the APA-EAPA monomers from Example 1, 7.3 g of 2-acrylamido-2-methyl-1-propanesulfonic acid, b 12 mg of 2,2'-azobis(2-amidinopropane) dihydrochloride and 35 ml deionized water. The solution was heated at 60° C. for 22 hours under stirring. The resulting polymer was purified in the same manner as described in Example 2, yielding 5.4 g powder.

The polymer was comprised of 14 mole % APA, 5 mole % EAPA, and 81 mole % 2-acrylamido-2-methyl-1-propanesulfonic acid (by $^{31}$P NMR) and had Mw and Mn (by GPC) of 182,000 and 71,000, respectively.

EXAMPLE 9

In a 100 ml flask similar to that of Example 2 were charged 3.7 g of the APA-EAPA monomers from Example 1, 2.5 g methacrylic acid, 6.0 g of 2-acrylamido-2-methyl-1-propanesulfonic acid, 12 mg of 2,2'-azobis(2-amidinopropane) dihydrochloride and 36 ml deionized water. The solution was heated at 60° C. for 22 hours under stirring. The resulting polymer was purified in the same manner as described in Example 2, yielding 6.8 g of white powder.

The composition of this polymer was characterized to be 11 mole% APA, 3 mole% EAPA, 46 mole% methacrylic acid and 40 mole% 2-acrylamido-2-methyl-1-propanesulfonic acid by $^1$H and $^{31}$P NMR. The Mw and Mn determined by GPC were 193,000 and 74,000, respectively.

EXAMPLE 10

A 300 ml two-neck round-bottom flask equipped with a condenser and a thermometer was charged with 95 g of diethyl allylphosphonate and 142 ml of concentrated hydrochloric acid. After the mixture was heated at 98° C. for 15 hours, the product was isolated by evaporating off all volatile components in vacuo. $^1$H NMR measurement indicated a mixture of APA and EAPA at 66:34 molar ratio.

EXAMPLE 11

A 100 ml four-neck reaction flask was equipped with a condenser, a thermometer, a nitrogen gas inlet, and two syringes for the addition of initiator and monomer solutions. The flask was then charged with 8.3 g of the APA-EAPA monomers from Example 10 and 3 ml of deionized water. After the flask was heated to 90° C., 5 ml of 30% aqueous hydrogen peroxide was added. An additional 10 ml of 30% aqueous hydrogen peroxide was transferred into a syringe. A solution of 6.5 g acrylic acid in 7 ml deionized water was prepared separately and transferred into another syringe. Both solutions were added into the flask over a period of 10 hours. After addition, the reaction was continued for another 4 hours at 90° C. The resulting polymer was then purified by ultrafiltration through a 1000 molecular weight cut-off membrane and finally isolated by lyophilization, yielding 3.9 g white powder.

The composition of this polymer was characterized to be 11 mole % APA, 5 mole % EAPA and 84 mole % acrylic acid by $^{31}$P NMR measurement. The Mw and Mn determined by GPC were 4300 and 2500, respectively.

EXAMPLE 12

Into a 100 ml flask similar to that of Example 11 was charged 7.0 g of the APA-EAPA monomers from Example 10. The flask was heated to 85° C. 0.90 g of 2,2'-azobis[2-methyl-N-(2-hydroxyethyl) propionamide dissolved in 25 ml of deionized water in a separate flask. 4 ml of this initiator solution was added into the reaction flask and the rest was transferred into a syringe. A solution of 8.6 g methacrylic acid and 5 ml deionized water was prepared separately and transferred to another syringe. Both the initiator and monomer solutions were added into the flask over 20 hours. After addition, the reaction was continued for another 10 hours at 85° C. The resulting polymer was purified and isolated in the same manner as described in Example 11, yielding 11.1 g of white powder.

The composition of this polymer was characterized to be 11 mole % APA, 6 mole % EAPA and 83 mole % methacrylic acid by $^{31}$P NMR. The Mw and mn determined by GPC were 27300 and 10200, respectively.

EXAMPLE 13

Into a 100 ml flask similar to that of Example 4 was charged 5.6 g of APA-EAPA monomers from Example 10. The flask was heated to 85° C. 0.15 g of 2,2'-azobis[2-methyl-N-(2-hydroxyethyl)propionamide] dissolved in 4 ml water was added to the flask. A solution containing 0.97 g of 2,2'-azobis[2-methyl-N(2-hydroxyethyl)propionamide], 13.0 g acrylamidoglycolic acid monohydrate and 70 ml dionized water was prepared separately and then added to the reaction flask via a syringe over a 20-hour period. After addition, the reaction was continued for another 10 hours at 85° C. The resulting polymer was purified and isolated in the same manner as described in Example 11, yielding 10.2 g white powder.

The composition of this polymer was characterized to be 29 mole % APA, 10 mole % EAPA and 61 mole % acrylamidoglycolic acid by $^{31}$P NMP. The Mw and Mn determined by GPC were 25700 and 5400, respectively.

EXAMPLE 14

Into a 50 ml flask similar to that of Example 4, were charged 8.3 g of the APA-EAPA monomers from Example 10, 4 ml of 30% aqueous hydrogen peroxide and 3 ml deionized water. The flask was heated to 90° C. A solution of 8.5 g acrylamide, 12 ml of 30% aqueous hydrogen peroxide and 7 ml deionized water was added slowly into the flask over a 10-period. After addition, the reaction was continued for another 10 hours at 90° C. The resulting polymer was purified and isolated in the same manner as described in Example 11, yielding 13.5 g of white powder.

The composition of this polymer was 17 mole % APA, 6 mole % EAPA and 77 mole % acrylamide by $^{31}$P NMR. The Mw and Mn determined by GPC were 27,000 and 7,000, respectively.

EXAMPLE 15

Into a 100 ml flask similar to that of Example 11 were charged 10.6 g of the APA-EAPA monomers from Example 10, 12.8 g of fumaric acid and 18 ml deionized water. The flask was heated to 90° C. under a nitrogen blanket. 2 ml of 20% aqueous hydrogen peroxide was added via syringe over 24 hours. From another syringe, 42.0 ml of 40% aqueous solution of sodium 2-hydroxy-3-allyloxy-1-propanesulfonate was added over a 12-hour period. After the flask was maintained at 90° C. for a total of 40 hours, the reaction mixture was neutralized to pH 12 with aqueous sodium hydroxide. The resulting polymer was purified and isolated in the same manner as described in Example 11, yielding 33.2 g product.

The composition of this polymer was determined by $^1$H and $^{31}$P NMR measurements to be approximately 15 mole % APA, 7 mole % EAPA, 52 mole % fumaric acid and 26 mole % sodium 2-hydroxy-3-allyloxy-1-propanesulfonate. The Mw and Mn determined by GPC were 6,000 and 3,600, respectively.

EXAMPLE 16

A mixture of 105 g diethyl allylphosphonate and 210 ml concentrated hydrochloric acid was heated at reflux for 16 hours. The product was isolated by evaporation of all volatile compounds in vacuo. $^1$H NMR measurement indicated a mixture of APA and EAPA at 72:28 molar ratio.

EXAMPLE 17

Into a 100 ml flask similar to that of Example 4 were charged 14.8 g of the APA-EAPA monomers from Example 16, 10.1 g of fumaric acid, and 20 ml of deionized water. After the flask was heated to 90° C., 3 ml of 11% aqueous hydrogen peroxide was added quickly to the flask and an additional 19 ml were added slowly over an 18-hour period. After the addition, the reaction was continued for another 14 hours at 90° C. The reaction mixture was cooled to room temperature and then neutralized to pH 12 using an aqueous sodium hydroxide solution. The resulting polymer was purified and isolated in the same manner as described in Example 11, yielding 23.0 g off-white powder.

The composition of this polymer was 24 mole % APA, 7 mole % EAPA and 69 mole % fumaric acid by $^{31}$P NMR. The Mw and Mn determined by GPC were 8000 and 5300, respectively.

EXAMPLE 18

Into a 100 ml flask similar to that of Example 2 were charged 13.5 g of the APA-EAPA monomers from Example 16, 15.2 g of fumaric acid, 1.68 g of 4,4'-azobis(4-cyanovaleric acid) and 34 ml of deionized water. The reaction mixture was then heated to 70° C. for 32 hours while stirring. After being neutralized to pH 12 with sodium hydroxide solution, the resulting polymer was purified and isolated in the same manner as described in Example 11, yielding 16.2 g off-white powder.

The composition of this polymer was 31 mole % APA, 13 mole % EAPA and 56 mole % fumaric acid by $^{31}$P NMR. The Mw and Mn determined by GPC were 10200 and 6800, respectively.

EXAMPLE 19

Into a 50 ml flask similar to that of Example 2 were charged 6.0 g of the APA-EAPA monomers from Example 16, 5.0 g of disodium fumarate, 0.21 g of 4,4'-azobis(4-cyanovaleric acid), and 11 ml of deionized water. The reaction mixture was heated a 70° C. for 24 hours while stirring. After being neutralized to pH 12 with sodium hydroxide solution, the resulting polymer was purified and isolated in the same manner as described in Example 11, yielding 4.4 g off-white powder.

The composition of this polymer was 17 mole % APA, 5 mole % EAPA, and 78 mole % disodium fumarate by $^{31}$P NMR. The Mw and Mn determined by GPC were 18300 and 10900, respectively.

EXAMPLE 20

Into a 25 ml flask similar to that of Example 4 were charged 4.2 g of the APA-EAPA monomers from Example 16, 3.2 g of maleic anhydride, and 7 ml of deionized water. The flask was heated to 90° C. while stirring. 1 ml of 10% aqueous hydrogen peroxide was added to the flask and an additional 9 ml was added slowly over 10 hours. After addition, the reaction was continued for another 15 hours at 90° C. The reaction mixture was neutralized to pH 9 with sodium hydroxide solution and the resulting polymer was purified and isolated in the same manner as described in Example 11, yielding 4.0 g off-white powder.

The composition of this polymer was 19 mole % APA, 6 mole % EAPA and 75 mole % maleate by $^{31}$P NMR. The Mw and Mn determined by GPC were 3600 and 2700, respectively.

EXAMPLE 21

Into a 25 ml flask similar to that of Example 4 were added 3.6 g of the APA-EAPA monomers from Example 16, 5.0 g sodium maleate monohydrate and 5 ml deionized water. The flask was heated to 90° C. while stirring. 1 ml of 10% aqueous hydrogen peroxide was added to the flask and an additional 9 ml was added slowly over 9 hours. After addition, the reaction was continued for another 15 hours at 90° C. The reaction mixture was neutralized to pH 9 with sodium hydroxide solution and the resulting polymer was purified and isolated in the same manner as described in Example 11, yielding 5.6 g off-white powder.

The composition of this polymer was 16 mole % APA, 3 mole % EAPA and 81 mole % sodium maleate by $^{31}$P NMR. The Mw and Mn determined by GPC were 7900 and 4300, respectively.

EXAMPLE 22

Into a 50 ml flask similar to that of Example 4 were charged 6.0 g of the APA-EAPA monomers from Example 16, 16.0 g of 35% aqueous solution of sodium allylsulfonate and 2 ml of 10% aqueous hydrogen peroxide. After the flask was heated to 90° C. under stirring, an additional 8 ml of 10% hydrogen peroxide was added via syringe over 20 hours. The reaction was continued further for 12 hours at 90° C. The reaction mixture was neutralized to pH 13 with sodium hydroxide solution and the polymer was purified and isolated in the same manner as described in Example 11, yielding 5.8 g product.

$^1$H and $^{31}$P NMR measurements indicated a polymer composition of 35 mole % APA, 10 mole % EAPA and 55 mole % sodium allysulfonate moieties. The Mw and Mn determined by GPC were 1,900 and 1,400 respectively.

EXAMPLE 23

Into a 50 ml flask similar to that of Example 4, were charged 7.1 g of the APA-EAPA monomers from Example 16 and 27.3 g of 40% aqueous solution of sodium 2-hydroxy-3-allyloxy-1-propanesulfonate. The flask was heated to 90° C. while stirring. 2 ml of 15% aqueous hydrogen peroxide was added to the flask and an additional 8 ml was added slowly over a 24-hour period. After addition, the reaction was continued for another 12 hours at 90° C. The reaction mixture was neutralized to pH 12 with sodium hydroxide and the resulting polymer was purified and isolated in the same manner as described in Example 11, yielding 2.8 g product.

$^1$H and $^{31}$P NMR measurements indicated a polymer composition of 30 mole % APA, 12 mole % EAPA and 58 mole % sodium 2-hydroxy-3-allyloxy-1-propanesulfonate moieties. The Mw and Mn determined by GPC were 1,600 and 1,200, respectively.

EXAMPLE 24

A mixture of 150 g diethyl allylphosphonate and 225 ml concentrated hydrochloric acid was heated to gently reflux for 16 hours. The product was isolated by evaporating off all volatile components in vacuo. $^1$H NMR measurement verified a mixture of APA and EAPA at 69:31 molar ratio.

EXAMPLE 25

Into a 50 ml flask similar to that of Example 4, were charged 6.8 g of the APA-EAPA monomers from Example 24, 6.4 g crotonic acid and 8 ml deionized water. The flask was heated to 85° C. 0.65 g of 2,2'-azobis[2-methyl-N(2-hydroxyethyl) propionamide] was dissolved in 20 ml deionized water. 4 ml of this initiator solution was added into the flask and the remaining was added slowly over a 10-hour period. After addition, the reaction was continued for another 12 hours at 85° C. The resulting polymer was purified and isolated in the same manner as described in Example 11, yielding 2.5 g off-white powder.

The composition of this polymer was 34 mole % APA, 15 mole % EAPA and 51 mole % crotonic acid by $^{31}$P NMR. The Mw and Mn determined by GPC were 6,800 and 3,500, respectively.

EXAMPLE 26

Into a 50 ml flask similar to that of Example 4, were charged 7.0 g of the APA-EAPA monomers from Example 24, 6.5 g itaconic acid and 10 ml deionized water. The flask was heated to 85° c. 0.65 g of 2,2'-azobis[2-methyl-(2-hydroxyethyl) propionamide] was dissolved in 18 ml deionized water. 4 ml of this initiator solution was added into the flask and the remaining was added slowly over a 8-hour period. After addition, the reaction was continued for another 8 hours at 85° c. The resulting polymer was purified and isolated in the same manner as described in Example 11, yielding 5.8 g off-white powder.

The composition of this polymer was 25 mole % APA, 9 mole % EAPA and 66 mole % itaconic acid by $^{31}$P NMR. The Mw and Mn determined by GPC were 10,700 and 5,200, respectively.

EXAMPLE 27

Into a 100 ml flask similar to that of Example 11 were charged 7.0 g of the APA-EAPA monomers from Example 24, 5.8 g of fumaric acid and 8 ml deionized water. The flask was heated to 90° C. under a nitrogen atmosphere. 4 ml of a solution containing 1.00 g of 2,2'-azobis[2-methyl-N(2-hydroxyethyl) propionamide] in 24 ml deionized water was added, and the remaining solution as transferred into a syringe. A solution of 7.2 g acrylic acid in 8 ml deionized water was separately prepared and transferred into another syringe. Both solutions were added simultaneously into the flask over a 10-hour period. After addition, the reaction was continued further for 5 hours. The mixture was neutralized to pH 12 with sodium hydroxide and the resulting polymer was purified and isolated in the same manner as described in Example 11, yielding 23.9 g white powder.

The $^1$H and $^{31}$P NMR measurements indicated 7 mole % of APA, 3 mole % of EAPA, 12 mole % of fumaric acid and 78 mole % of acrylic acid units in the polymer. GPC measurement showed Mw and Mn of 30,500 and 11,700, respectively.

EXAMPLE 28

Into a 100 ml flask similar to that of Example 11 were charged 8.4 g of the APA-EAPA monomers form Example 24, 9.0 g of fumaric acid and 10 ml deionized water. The flask was heated to 90° C. under a nitrogen atmosphere. 5 ml of a solution of 2,2'-azobis[2methyl-N(2-hydroxyethyl) propionamide] in 30 ml deionized water was charged into the flask while the remaining solution was transferred into a syringe. A solution of 5.2 g methacrylic acid in 5 ml deionized water was separately prepared and transferred to another syringe. Both solutions were added simultaneous to the flask over a 15-hour period. The reaction was continued further for 5 hours. The mixture was neutralized to pH 11 with sodium hydroxide and the resulting polymer was purified and isolated in the same manner as described in Example 11, yielding 19.9 g product.

The composition of this polymer was determined by $^1$H and $^{31}$P NMR measurements to be approximately 27 mole % APA, 6 mole % EAPA, 14 mole % fumaric acid and 53 mole % methacrylic acid. The Mw and Mn determined by GPC were 13,900 and 6,000, respectively.

EXAMPLE 29

Into a 100 ml flask similar to that of Example 4 were charged 8.5 g of the APA-EAPA monomers from Example 24, 2,2'-azobis(2-methyl-N(2-hydroxyethyl) propionamide] and 4 ml deionized water. The flask was heated to 90° C. under a nitrogen atmosphere. A solution containing 8.0 g methacrylic acid, 4.1 g sodium styrenesulfonate and 24 ml deionized water was prepared separately. 4 ml of this monomer solution was added to the flask and the remainder was introduced slowly via a syringe over a 14-hour period. About 4 hours after the reaction started, 0.14 g of the above mentioned initiator was added. After another 4 hours, an additional 0.16 g of the same initiator was added to the flask. The reaction was maintained at 90° C. for a total of 24 hours. The product was purified and isolated in the same manner as described in Example 11, yielding 12.4 g powder.

The composition of this polymer was determined by $^1$H and $^{31}$P NMR measurements to be approximately 6 mole % APA, 3 mole % EAPA, 72 mole % methacrylic acid and 19 mole % styrenesulfonate. The Mw and Mn determined by GPC were 44,000 and 11,400, respectively.

EXAMPLE 30

Into a 100 ml flask similar to that of Example 4 were charged 2.8 g of the APA-EAPA monomers from Example 24, 5.2 g of fumaric acid, 0.23 g of 2,2'-azobis(2-methyl-N(2-hydroxyethyl) propionamide], and 15 ml deionized water. After the flask was heated to 90° C. under a nitrogen atmosphere, a solution of 7.2 g sodium styrenesulfonate in 8 ml deionized water was added via syringe over a 10-hour period. At about one-half of the sulfonate solution was introduced, an additional 0.22 g of the above mentioned initiator was charged into the flask. The reaction was maintained at 90° C. for a total of 18 hours. The reaction mixture was then neutralized with aqueous sodium hydroxide and the resulting polymer was purified and isolated in the same manner as described in Example 11, yielding 11.8 g product.

The composition of this polymer was determined by $^1$H and $^{31}$P NMR measurements to be approximately 8 mole % APA, 2 mole % EAPA, 52 mole % fumaric acid and 38 mole % styrenesulfonate. GPC measurement indicated Mw and Mn of 24,000 and 5,500, respectively.

EXAMPLE 31

Into a 100 ml flask similar to that of Example 11 were charged 3.5 g of the APA-EAPA monomers from Example 24 and 10.3 g of 35% aqueous solution of sodium allylsulfonate. After the flask was heated to 90° C. under a nitrogen atmosphere, 3 ml of 20% aqueous hydrogen peroxide was charged to the flask and an additional 20 ml was added slowly via a syringe over 18 hours. From another syringe, a solution of 14.4 g acrylic acid and 20 ml deionized water was added simultaneously over a 18-hour period. The reaction solution was kept at 90° C. for another 4 hours. The product was purified and isolated in the same manner as described in Example 11, yielding 13.5 g polymer.

The composition of this polymer was determined by $^1$H and $^{31}$P NMR measurements to be approximately 7 mole % APA, 1 mole % EAPA, 86 mole % acrylic acid and 6 mole % sodium allylsulfonate. The Mw and Mn determined by GPC were 8,900 and 3,700, respectively.

EXAMPLE 32

Into a 100 ml flask similar to that of Example 4 were charged 9.0 g of the APA-EAPA monomers from Example 24, 9.3 g fumaric acid and 10 ml deionized water. The flask was heated to 95° C. under a nitrogen atmosphere. A mixed initiator-monomer solution was prepared separately consisting of 10 ml of 30% hydrogen peroxide, 6.6 g of 35% aqueous solution of sodium allylsulfonate and 7 ml deionized water. 3 ml of this solution was added immediately to the flask while the remainder was introduced slowly via a syringe over a 24-hour period. The reaction was continued for another 16 hours at 95° C. The mixture was neutralized to pH 12 with sodium hydroxide and the resulting polymer was purified and isolated in the same manner as described in Example 11, yielding 16.4 g product.

The $^1$H and $^{31}$P NMR measurements indicated 17 mole % APA, 6 mole % EAPA, 70 mole % fumaric acid and 7 mole % of sodium allylsulfonate units in the polymer. GPC measurements showed Mw and Mn of 7,500 and 4,200, respectively.

The examples describe various embodiments of the invention. Other embodiments will be apparent to those skilled in the art from a consideration of the specification or practice of the invention disclosed herein. It is understood that modifications and variations may be practiced without departing from the spirit and scope of the novel concepts of this invention. It is further understood that the invention is not confined to the particular formulations and examples herein illustrated, but it embraces such modified forms thereof as come within the scope of the following claims.

What is claimed:

1. Water-soluble copolymers consisting essentially of the reaction product of one or more allyl phosphonate monomers having the formula:

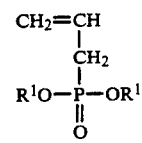

and one or more water-soluble, α, β-ethylenically unsaturated non-phosphorus containing monomers having the formula:

wherein each $R^1$ is independently selected from the group consisting of hydrogen, lower alkyl groups having from 1 to about 4 carbon atoms and salt forming cations, $R^2$ and $R^3$ are independently selected from the group consisting of hydrogen, halogen, COOH, $CH_2COOH$, lower alkyl groups having from 1 to about 4 carbon atoms, and phenyl, and A is selected from the group consisting of $SO_3H$, $CH_2SO_3H$, $CH(CH_3)SO_3H$, $CH_2OCH_2CH(OH)CH_2SO_3H$, $\phi\text{-}SO_3H$,

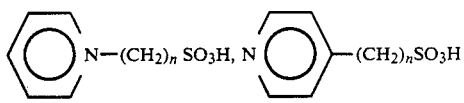

wherein n=2 to 4, CONH₂, CONHCH₃, CON(CH₃)₂, CONHCH₂OH, CONHCH(OH)COOH, CONHC(CH₃)₂CH₂SO₃H, COO(CH₂)ₙSO₃H wherein n=2 to 4, and CO(OCH₂CH₂)ₙOH wherein n=1 or more, and the corresponding water soluble salts of the sulfonate and carboxylate groups.

2. A water-soluble copolymer according to claim 1 wherein the copolymer has a weight average molecular weight between about 500 and about 1,000,000.

3. A water-soluble copolymer according to claim 1 wherein the copolymer has weight average molecular weight about 100,000 or less.

4. A water-soluble copolymer according to claim 1 which is the reaction product derived by copolymerizing allylphosphonic acid, ethyl allylphosphonic acid and fumaric acid.

5. A water-soluble copolymer according to claim 4 having about 24 mole % structural units derived from allylphosphonic acid, about 7 mole % structural units derived from ethyl allylphosphonic acid and about 69 mole % structural units derived from fumaric acid.

6. A water-soluble copolymer according to claim 5 wherein the weight average molecular weight is between about 1,000 and 10,000.

7. A water-soluble copolymer according to claim 1 wherein R¹ is hydrogen, or CH₂CH₃ or mixtures thereof.

8. A water-soluble copolymer according to claim 1 wherein R² is hydrogen or COOH, R³ is hydrogen or CH₃ and A is CH₂SO₃H, φSO₃H, CONHC(CH₃)₂CH₂SO₃H or CH₂OCH₂CH(OH)CH₂SO₃H.

9. A water-soluble copolymer according to claim 1 wherein the copolymer is derived from a mixture of monomers which include the following: R¹ is hydrogen, CH₂CH₃ or mixtures thereof, a first water-soluble, α,β-ethylenically unsaturated, non-phosphorus containing monomer wherein R² is COOH, R³ is hydrogen and A is COOH and a second water soluble, α,β-ethylenically unsaturated, non-phosphorus containing monomer wherein R² is hydrogen, R³ is hydrogen and A is CH₂SO₃H, φSO₃H, CONHC(CH₃)₂CH₂SO₃H or mixtures thereof.

10. A water soluble copolymer according to claim 1 wherein R¹ is hydrogen, CH₂CH₃ or mixtures thereof, a first water-soluble, α,β-ethylenically unsaturated, non-phosphorus containing monomer wherein R² is hydrogen, R³ is hydrogen, CH₃ or mixtures thereof, and A is COOH, and a second water-soluble α,β-ethylenically unsaturated, non-phosphorus containing monomer wherein R² is hydrogen, R³ is hydrogen, and A is CH₂SO₃H, φSO₃H, CONHC(CH₃)₂CH₂SO₃H or mixtures thereof.

11. A water-soluble allylphosphonate copolymer having the formula:

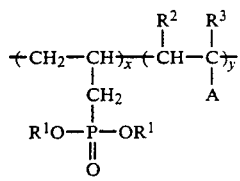

wherein the molar percentage of x in the copolymer is from 1 to 90 percent, the molar percentage of y in the copolymer is from 10 to 99 percent, and the total of x and y being 100 percent; and wherein each R¹ is independently selected from the group consisting of hydrogen, lower alkyl groups having from 1 to about 4 carbon atoms and a salt forming cation, R² and R³ are independently selected from the group consisting of hydrogen, halogen, COOH, CH₂COOH, lower alkyl groups having from 1 to about 4 carbon atoms, and phenyl, and A is selected from the group consisting of SO₃H, CH₂SO₃H, CH(CH₃)SO₃H, CH₂OCH₂CH(OH)CH₂SO₃H, φ-SO₃H,

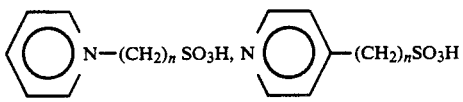

wherein n=2 to 4, CONH₂, CONHCH₃, CON(CH₃)₂, CONHCH₂OH, CONHCH(OH)COOH, CONHC(CH₃)₂CH₂SO₃H, COO(CH₂)ₙSO₃H wherein n=2 to 4, and CO(OCH₂CH₂)ₙOH wherein n=1 or more, water soluble salts of sulfonate and carboxylate groups.

12. A water-soluble allylphosphonate copolymer according to claim 11 wherein both R¹ groups are C₁ to C₄ alkyl and the molar percentage of x in the copolymer is from 1 to 50 percent.

13. A water-soluble allylphosphonate copolymer according to claim 11 wherein the copolymer has a weight average molecular weight between 500 and 1,000,000.

14. A water-soluble allylphosphonate copolymer according to claim 11 wherein R¹ is hydrogen or CH₂CH₃, R² is hydrogen or COOH, R³ is hydrogen or CH₃ and A is CH₂SO₃H, φSO₃H, CONHC(CH₃)₂CH₂SO₃H, or CH₂OCH₂CH(OH)CH₂SO₃H.

15. Water-soluble copolymers consisting essentially of the reaction product of one or more allyl phosphonate monomers having the formula:

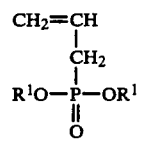

wherein R¹ is independently selected from the group consisting of hydrogen, lower alkyl groups having from 1 to about 4 carbon atoms and salt forming cations; and a first water-soluble, α, β-ethylenically unsaturated non-phosphorus containing monomer having the formula:

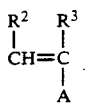

wherein $R^2$ and $R^3$ are independently selected from the group consisting of hydrogen, halogen, COOH, $CH_2COOH$, lower alkyl groups having from 1 to about 4 carbon atoms, and phenyl, and A is selected from the group consisting of $SO_3H$, $CH_2SO_3H$, $CH(CH_3)SO_3H$, $CH_2OCH_2CH(OH)CH_2SO_3H$, $\phi$-$SO_3H$,

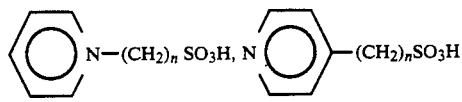

wherein n=2 to 4, $CONH_2$, $CONHCH_3$, $CON(CH_3)_2$, $CONHCH_2OH$, $CONHCH(OH)COOH$, $CONHC(CH_3)_2CH_2SO_3H$, $COO(CH_2)_nSO_3H$ wherein n=2 to 4, and $CO(OCH_2CH_2)_nOH$ wherein n=1 or more of the sulfonate groups and their corresponding water soluble salts; and a second water-soluble, $\alpha, \beta$-ethylenically unsaturated non-phosphorus containing monomer having the above defined formula except that A is selected from the group consisting of COOH, $CH_2COOH$, and $\phi COOH$, and their corresponding water soluble salts of the carboxylate groups.

16. A water-soluble allylphosphonate copolymer according to claim 15 wherein $R^1$ is hydrogen or $CH_2CH_3$ and a first comonomer wherein $R^2$ is COOH, $R^3$ is hydrogen and A is COOH, and a second comonomer wherein $R^2$ is hydrogen, $R^3$ is hydrogen and A is $CH_2SO_3H$, $\phi SO_3H$, or $CONHC(CH_3)_2CH_2SO_3H$.

17. A water-soluble allylphosphonate copolymer according to claim 15 wherein $R^1$ is hydrogen or $CH_2CH_3$ and a first comonomer wherein $R^2$ is hydrogen, $R^3$ is hydrogen or $CH_3$, A is COOH, and a second comonomer wherein $R^2$ is hydrogen, $R^3$ is hydrogen and A is $CH_2SO_3H$, $\phi SO_3H$, or $CONHC(CH_3)_2CH_2SO_3H$.

* * * * *